(12) United States Patent
El-Moussa (10) Patent No.: US 10,733,296 B2
(45) Date of Patent: Aug. 4, 2020

(54) SOFTWARE SECURITY

(71) Applicant: British Telecommunications Public Limited Company, London (GB)

(72) Inventor: Fadi El-Moussa, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 16/065,665

(22) PCT Filed: Dec. 22, 2016

(86) PCT No.: PCT/EP2016/082477
§ 371 (c)(1),
(2) Date: Jun. 22, 2018

(87) PCT Pub. No.: WO2017/109129
PCT Pub. Date: Jun. 29, 2017

(65) Prior Publication Data
US 2018/0373876 A1    Dec. 27, 2018

(30) Foreign Application Priority Data
Dec. 24, 2015 (EP) ................. EP15202731

(51) Int. Cl.
*G06F 21/56* (2013.01)
*G06F 21/53* (2013.01)
(52) U.S. Cl.
CPC ............ *G06F 21/566* (2013.01); *G06F 21/53* (2013.01); *G06F 21/563* (2013.01); *G06F 2221/033* (2013.01); *G06F 2221/2149* (2013.01)
(58) Field of Classification Search
CPC .............. G06F 21/566; G06F 21/53; G06F 2221/2149; G06F 2221/033; G06F 21/563
(Continued)

(56) References Cited

U.S. PATENT DOCUMENTS 6,546,397 B1 * 4/2003 Rempell .................. G06F 8/20
7,007,301 B2    2/2006 Crosbie et al.
(Continued)

FOREIGN PATENT DOCUMENTS

EP    2 741 227 A1    6/2014
EP    2 750 070 A2    7/2014
(Continued)

OTHER PUBLICATIONS

Application and Filing Receipt for U.S. Appl. No. 15/541,089, filed Jun. 30, 2017, Inventor(s): El-Moussa.
(Continued)

*Primary Examiner* — Saleh Najjar
*Assistant Examiner* — Peiliang Pan
(74) *Attorney, Agent, or Firm* — Patterson Thuente Pedersen, P.A.

(57) ABSTRACT

A computer implemented method of detecting malicious code in a software application executing with a runtime environment in a computer system, the method including: receiving a definition of one or more runtime exception trigger conditions, each trigger condition defining criteria for the runtime environment to enter a software exception state and having associated a definition of a resulting state of the runtime environment having entered the exception state; monitoring the runtime environment to detect the satisfaction of a detected trigger condition by the runtime environment and, in response to a determination that the runtime environment fails to enter a resulting state associated with the detected trigger condition, identifying the software application as including malicious code.

10 Claims, 6 Drawing Sheets

(58) Field of Classification Search
USPC .......................................................... 726/23
See application file for complete search history.

(56) References Cited

U.S. PATENT DOCUMENTS

| | | | | |
|---|---|---|---|---|
| 7,093,750 | B1* | 8/2006 | Block | G07F 19/20 |
| | | | | 235/379 |
| 7,127,461 | B1* | 10/2006 | Zhu | G06F 21/6218 |
| | | | | 707/694 |
| 7,716,739 | B1 | 5/2010 | McCorkendale | |
| 8,578,017 | B2* | 11/2013 | Cobb | H04L 41/5003 |
| | | | | 709/203 |
| 8,613,039 | B2* | 12/2013 | Chen | G06F 16/972 |
| | | | | 726/1 |
| 8,706,852 | B2* | 4/2014 | Kunze | G06F 9/5061 |
| | | | | 370/252 |
| 8,713,631 | B1* | 4/2014 | Pavlyushchik | G06F 21/566 |
| | | | | 726/1 |
| 8,751,466 | B1* | 6/2014 | Tsay | G06F 16/951 |
| | | | | 707/700 |
| 8,806,638 | B1 | 8/2014 | Mani | |
| 8,813,234 | B1 | 8/2014 | Bowers et al. | |
| 8,898,788 | B1 | 11/2014 | Aziz et al. | |
| 8,910,238 | B2 | 12/2014 | Lukacs et al. | |
| 9,009,825 | B1 | 4/2015 | Chang et al. | |
| 9,576,137 | B2* | 2/2017 | Habel | G06F 21/60 |
| 9,807,106 | B2 | 10/2017 | Daniel et al. | |
| 9,942,268 | B1* | 4/2018 | Danileiko | H04L 63/1466 |
| 2001/0019614 | A1* | 9/2001 | Madoukh | G06F 21/6245 |
| | | | | 380/277 |
| 2003/0084349 | A1 | 5/2003 | Friedrichs et al. | |
| 2003/0167421 | A1* | 9/2003 | Klemm | G06F 9/3861 |
| | | | | 714/37 |
| 2003/0217053 | A1* | 11/2003 | Bachman | G05B 19/41865 |
| 2004/0149818 | A1* | 8/2004 | Shepley | G07F 19/20 |
| | | | | 235/379 |
| 2004/0158741 | A1 | 8/2004 | Schneider | |
| 2004/0230834 | A1 | 11/2004 | McCallam | |
| 2005/0054268 | A1* | 3/2005 | Kistler | B24B 37/005 |
| | | | | 451/5 |
| 2005/0097146 | A1* | 5/2005 | Konstantinou | H04L 41/0866 |
| 2005/0108562 | A1* | 5/2005 | Khazan | G06F 11/3604 |
| | | | | 726/23 |
| 2006/0048013 | A1* | 3/2006 | Barsness | G06F 11/366 |
| | | | | 714/38.14 |
| 2006/0101401 | A1* | 5/2006 | Brumme | G06F 11/1482 |
| | | | | 717/124 |
| 2007/0016953 | A1 | 1/2007 | Morris et al. | |
| 2007/0074169 | A1* | 3/2007 | Chess | G06F 21/54 |
| | | | | 717/126 |
| 2007/0240222 | A1 | 10/2007 | Tuvell et al. | |
| 2007/0291791 | A1* | 12/2007 | English | H04L 45/00 |
| | | | | 370/469 |
| 2008/0229819 | A1* | 9/2008 | Mayleben | F04B 49/06 |
| | | | | 73/304 C |
| 2008/0320594 | A1 | 12/2008 | Jiang | |
| 2009/0044024 | A1 | 2/2009 | Oberheide et al. | |
| 2009/0055693 | A1 | 2/2009 | Budko et al. | |
| 2010/0011029 | A1 | 1/2010 | Niemelae et al. | |
| 2010/0012718 | A1* | 1/2010 | Griswold | G07F 19/20 |
| | | | | 235/379 |
| 2010/0057774 | A1* | 3/2010 | Pizano | G06F 21/53 |
| | | | | 707/E17.055 |
| 2010/0175108 | A1 | 7/2010 | Protas | |
| 2010/0257608 | A1 | 10/2010 | Jeong et al. | |
| 2010/0262873 | A1 | 10/2010 | Chang et al. | |
| 2010/0318652 | A1* | 12/2010 | Samba | H04L 41/5009 |
| | | | | 709/224 |
| 2011/0004935 | A1 | 1/2011 | Moffie et al. | |
| 2011/0023118 | A1 | 1/2011 | Wright | |
| 2011/0167491 | A1 | 7/2011 | Ruggerio | |
| 2011/0196891 | A1* | 8/2011 | de Castro Alves | G06F 9/445 |
| | | | | 707/769 |
| 2011/0197256 | A1 | 8/2011 | Sharkey et al. | |
| 2011/0228924 | A1* | 9/2011 | Tal | H04M 3/42374 |
| | | | | 379/207.06 |
| 2011/0258138 | A1* | 10/2011 | Kulkarni | G06Q 10/067 |
| | | | | 705/348 |
| 2012/0284794 | A1 | 11/2012 | Trent et al. | |
| 2013/0006949 | A1 | 1/2013 | Essawi et al. | |
| 2013/0097198 | A1* | 4/2013 | Goteti | G06F 16/1734 |
| | | | | 707/769 |
| 2013/0097248 | A1* | 4/2013 | Chakra | H04L 51/22 |
| | | | | 709/206 |
| 2013/0132419 | A1* | 5/2013 | Befort | G06F 16/2428 |
| | | | | 707/769 |
| 2013/0263209 | A1* | 10/2013 | Panuganty | H04L 43/04 |
| | | | | 726/1 |
| 2014/0090008 | A1* | 3/2014 | Li | G06F 21/62 |
| | | | | 726/1 |
| 2014/0107836 | A1* | 4/2014 | Crews | G07F 19/206 |
| | | | | 700/236 |
| 2014/0115596 | A1* | 4/2014 | Khan | G06F 9/5011 |
| | | | | 718/104 |
| 2014/0164251 | A1 | 6/2014 | Loh | |
| 2014/0173740 | A1 | 6/2014 | Albanese et al. | |
| 2015/0101055 | A1 | 4/2015 | Tang et al. | |
| 2015/0120567 | A1 | 4/2015 | Van Rooyen et al. | |
| 2015/0332283 | A1 | 11/2015 | Witchey | |
| 2015/0378763 | A1* | 12/2015 | Hassine | G06F 9/45558 |
| | | | | 718/1 |
| 2016/0019385 | A1* | 1/2016 | Holt | G06F 21/53 |
| | | | | 726/22 |
| 2016/0021122 | A1 | 1/2016 | Pevny | |
| 2016/0110192 | A1* | 4/2016 | Mikkilineni | G06F 9/30 |
| | | | | 718/100 |
| 2016/0283307 | A1* | 9/2016 | Takeshima | G06F 11/079 |
| 2016/0366155 | A1 | 12/2016 | El-Moussa et al. | |
| 2017/0013000 | A1 | 1/2017 | El-Moussa et al. | |
| 2017/0048252 | A1* | 2/2017 | Straub | H04L 67/10 |
| 2017/0048319 | A1* | 2/2017 | Straub | H04L 67/2847 |
| 2017/0103203 | A1* | 4/2017 | Sharma | G06F 21/552 |
| 2017/0142133 | A1 | 5/2017 | Kallos | |
| 2017/0223032 | A1 | 8/2017 | El-Moussa et al. | |
| 2017/0351860 | A1 | 12/2017 | El-Moussa | |
| 2017/0351861 | A1 | 12/2017 | El-Moussa et al. | |
| 2018/0025166 | A1 | 1/2018 | Daniel et al. | |
| 2018/0053002 | A1 | 2/2018 | El-Moussa et al. | |
| 2018/0054451 | A1 | 2/2018 | El-Moussa et al. | |
| 2018/0060575 | A1 | 3/2018 | El-Moussa et al. | |
| 2018/0060581 | A1 | 3/2018 | El-Moussa et al. | |
| 2018/0060582 | A1 | 3/2018 | El-Moussa et al. | |
| 2018/0091531 | A1 | 3/2018 | El-Moussa et al. | |
| 2018/0115566 | A1 | 4/2018 | Azvine et al. | |
| 2018/0115567 | A1 | 4/2018 | El-Moussa et al. | |
| 2019/0188392 | A1 | 6/2019 | El-Moussa et al. | |

FOREIGN PATENT DOCUMENTS

| | | |
|---|---|---|
| EP | 2 816 469 A1 | 12/2014 |
| WO | WO 01/84285 A2 | 11/2001 |
| WO | WO 2009/097610 A1 | 8/2009 |
| WO | WO 2012/087685 A1 | 6/2012 |
| WO | WO 2013/172750 A1 | 11/2013 |
| WO | WO 2015/128612 A1 | 9/2015 |
| WO | WO 2015/179020 A2 | 11/2015 |
| WO | WO 2016/034496 A1 | 3/2016 |
| WO | WO 2017/021153 A1 | 2/2017 |
| WO | WO 2017/021154 A1 | 2/2017 |
| WO | WO 2017/021155 A1 | 2/2017 |
| WO | WO 2017/109128 A1 | 6/2017 |
| WO | WO 2017/167544 A1 | 10/2017 |
| WO | WO 2017/167545 A1 | 10/2017 |
| WO | WO 2018/033375 A3 | 2/2018 |

OTHER PUBLICATIONS

Application and Filing Receipt for U.S. Appl. No. 15/541,128, filed Jun. 30, 2017, Inventor(s): El-Moussa et al.

(56) References Cited

OTHER PUBLICATIONS

International Search Report and Written Opinion for PCT Application No. PCT/EP2015/080246 dated Mar. 14, 2016; 10 pages.
International Search Report and Written Opinion for PCT Application No. PCT/EP2015/080244 dated Mar. 24, 2016; 9 pages.
Open Virtualization Format Specification; Distributed Management Task Force, Inc.; Document No. DSP0243; Jan. 12, 2010; 42 pages; Version: 1.1.0.
"A Next-Generation Smart Contract and Decentralized Application Platform" Ethereum White Paper, 2016, retrieved from https://github.com/ethereum/wiki/wiki/White-Paper.
Ahmad S., et al., "How Do Neurons Operate on Sparse Distributed Representations? A Mathematical Theory of Sparsity, Neurons and Active Dendrites," available from Cornell University Library (citation arXiv: 1601.00720) and https://arxiv.org/ftp/arxiv/papers/1601/1601.00720.pdf, retrieved on Mar. 28, 2018, 23 pages.
Ahmad S., et al., "Properties of Sparse Distributed Representations and their Application to Hierarchical Temporal Memory," available from Cornell University Library (citation arXiv: 1503.07469) and https://arx.iv.org/ftp/arx.iv/papers/1503/1503.07469.pdf, retrieved on Mar. 28, 2018, Numenta, Redwood City, CA, USA, Mar. 24, 2015, 18 pages.
Ahiviad S., et al., "Real-Time Anomaly Detection for Streaming Analytics," available from Cornell University Library (citation arXiv: 1607.02480) and https://arxiv.org/pdf/1607.02480.pdf, retrieved on Mar. 28, 2018, Numenta, Inc., Redwood City, CA, USA, Jul. 8, 2016, 10 pages.
Anonymous: "Who will protect users from ethereum based malware?" Mar. 28, 2016 XP055306678, Retrieved from the Internet: URL: https://www.reddit.com/r/ethereum/comments/4ccfaa/who_will_protect_users_from_ethereum_based_malware/?st=itbp2q49&sh=d8cc4355 on Sep. 29, 2016.
Anonymous, "Can BitCoin be a better DRM? BitcoinBeginners," retrieved from https://www.reddit.com/r/BitcoinBeginners/commentsll y5yh8/can bitcoin be_a_better_drm, Feb. 17, 2014, 3 pages.
Anonymous, "Colored Coins—Bitcoin Wiki," Retrieved from https://en.bitcoin.it/w/index.php?title=ColoredCoins&oldid=57259, Jul. 7, 2015, 6 pages.
Antonopoulos A M., "Mastering Bitcoin-Unlocking Digital Crypto-Currencies," Early Release Raw & Unedited, ISBN: 978-1-449-37404-4; retrieved from: https://unglueitfiles.s3.amazonaws.com/ebf/05db7df4f31840f0a873d6ea14dcc28d.pdf, Dec. 2014, 282 pages.
Assia Y., et al., "Colored Coins Whitepaper," 2015, available at docs.google.com/document/d/1AnkPcVZTCMLizw4DvsW6M8Q2JCOllzrTLuoWu2zlBE, 23 pages.
Benders J.F., "Partitioning Procedures for Solving Mixed Variables Programming Problems," 1962, vol. 4, pp. 238-252.
Billaudelle S., et al., "Porting HTM Models to the Heidelberg Neuromorphic Computing Platform," available from Cornell University Library (citation arXiv: 1505. 02142), retrieved on Mar. 28, 2018, from https://arx.iv.org/pdf/1505.02142.pdf, Kirchhoff-Institute for Physics, May 2015, 9 pages.
Biryukov A., et al., "University of Luxembourg" Jan. 19, 2016, XP055306767, Luxemburg, retrieved from URL:http://wwwfr.uni.lu/snt/news_events/speaker_s_presentations on Sep. 29, 2016, pp. 5 and 29.
Bonneau J., et al., "Research Perspectives and Challenges for Bitcoin and Cryptocurrencies," International Association for Cryptologic Research, Mar. 19, 2015, 18 pages.
Chaisiri, "Optimization of Resource Provisioning Cost in Cloud Computing," IEEE Transactions on Services Computing, Apr.-Jun. 2012, vol. 5 (2), 14 pages.
Cruz J.P., et al., "The Bitcoin Network as Platform for TransOrganizational Attribute Authentication," WEB 2015, The Third International Conference on Building and Exploring Web Based Environments, XP055239598, Rome, Italy, 2015, 7 pages.
Cui, et al., "Continuous Online Sequence Learning with an Unsupervised Neural Network Model," Published in Neural Computation and available from https://www.mitpressjournals.org/doi/pdf/10.1162/NECOa_00893, retrieved on Mar. 28, 2018, Numenta Inc., Redwood City, CA, USA, Nov. 2016, vol. 28 (11), 31 pages.
Cui, et al., "The HTM Spatial Pooler: A Neocortical Algorithm for Online Sparse Distributed Coding," available from Cold Spring Harbor Laboratory bioRxiv (citation doi.org/10.1101/085035) and https://www.biorxiv.org/content/biorxiv/early/2017/02/16/085035.full.pdf, retrieved on Mar. 28, 2018, Numenta Inc., Redwood City, CA, USA, Feb. 3, 2017, 16 pages.
CVE Details The Ultimate Security Vulnerability Datasouce, "Current CVSS Score Distribution for All Vulnerabilities" retrieved from https://www.cvedetails.com/ on Jun. 28, 2018, 1 page.
Czepluch J.S., et al., "The Use of Block Chain Technology in Different Application Domains," XP055242451, retrieved from http://http://www.lollike.org/bachelor.pdf, May 20, 2015, 109 pages.
Dr Gavin Wood, "Ethereum: A Secure Decentralize Generalized Transaction Ledger," EIP-150 Revision, Retrieved from http://gavwood.com//paper.pdf, Jun. 4, 2014, 32 pages.
Extended European Search Report for Application No. EP15179440.1, dated Feb. 10, 2016, 6 pages.
First.org, Inc., "Common Vulnerability Scoring System, V3 Development Update," available at www.first.org/cvss, CVSS v3.0 User Guide (v1.5), 15 pages, Jun. 2015.
Fischer A., et al., "An Introduction to Restricted Boltzmann Machines," in: Progress in Pattern Recognition, Image Analysis, Computer Vision and Applications, vol. 7441 of the series Lecture Notes in Computer Science, 2012, pp. 14-36.
Frigault M., "Measuring Network Security Using Bayesian Network-Based Attack Graphs," The Concordia Institute of Information systems Engineering, Mar. 2010, 88 pages.
Grushack J., et al., "Currency 3.0, Examining Digital Crypto Currency Markets," Union College, XP055242356, Retrieved from http://antipasto.union.edu/engineering/Archives/SeniorProjects/2014/CS.2014/files/grushacj/grushacj_paper.pdf, Jun. 2014, 44 pages.
Hawkins, et al., in "On Intelligence, How a New Understanding of the Brain Will Lead to the Creation of Truly Intelligent Machines," Times Books, ISBN 0-8050-7 456-2, 2004, 174 pages, Jul. 14, 2005.
Hawkins, et al., "Why Neurons Have Thousands of Synapses, A Theory of Sequence Memory in Neocortex," Published in Frontiers in Neural Circuits (10 (2016) 1-13, doi:10.3389/fncir.2016.00023) and available from https://www.frontiersin.org/articles110.3389/fncir.2016.00023/full, retrieved on Mar. 28, 2018, Numenta Inc., Redwood City, CA, USA, Mar. 30, 2016, 13 pages.
International Preliminary Report on Patentability for Application No. PCT/EP2017/055081, dated Oct. 11, 2018, 9 pages.
International Preliminary Report on Patentability for Application No. PCT/EP2017/055082, dated Oct. 11, 2018, 8 pages.
International Preliminary Report on Patentability for Application No. PCT/EP2017/055090, dated Oct. 11, 2018, 10 pages.
International Preliminary Report on Patentability for Application No. PCT/EP2017/055091, dated Oct. 11, 2018, 9 pages.
International Search Report and Written Opinion for Application No. PCT/EP2015/080244, dated Mar. 24, 2016, 9 pages.
International Search Report and Written Opinion for Application No. PCT/EP2015/080246, dated Mar. 14, 2016, 10 pages.
International Search Report and Written Opinion for Application No. PCT/EP2016/067309, dated Nov. 3, 2016, 9 pages.
International Search Report and Written Opinion for Application No. PCT/EP2016/067310, dated Sep. 22, 2016, 9 pages.
International Search Report and Written Opinion for Application No. PCT/EP2017/055081, dated Apr. 7, 2017, 11 pages.
International Search Report and Written Opinion for Application No. PCT/EP2017/055082, dated Apr. 26, 2017, 9 pages.
International Search Report and Written Opinion for Application No. PCT/EP2017/055090, dated Jun. 14, 2017, 12 pages.
International Search Report and Written Opinion for Application No. PCT/EP2017/055091, dated Apr. 11, 2017, 11 pages.
International Search Report and Written Opinion for Application No. PCT/EP2017/055095, dated Apr. 11, 2017, 10 pages.
International Preliminary Report on Patentability for Application No. PCT/EP2017/055095, dated Oct. 11, 2018, 8 pages.
Lavin, et al., "Evaluating Real-time Anomaly Detection Algorithms, the Numenta Anomaly Benchmark," available from Cornell University Library (citation archive:1510.03336) https://arxiv.org/ftp/

(56) References Cited

OTHER PUBLICATIONS arxiv/papers/1510/1510.03336.pdf, retrieved on Mar. 28, 2018, Numenta, Inc., Redwood City, CA, USA, Oct. 9, 2015, 8 pages.
Adler M., "Threat Intelligence Visibility—the way forward," BT, 2015, available from www.globalservices.bt.com/uk/en/products/assure threat_monitoring.
Miller A., "The State-of-the-Art of Smart Contracts" Jan. 19, 2016, XP055306766, Luxemburg retrieved from the Internet: URL: http://wwwfr.uni.lu/snt/news_events/speaker_s_presentations on Sep. 29, 2016, pp. 7-8, 16 and 18.
Munoz-Gonzalez, "Exact Inference Techniques for the Dynamic Analysis of Bayesian Attack Graphs," Imperial college, London, Oct. 2015, 14 pages.
Numenta, "Biological and Machine Intelligence (BAMI), A living book that documents Hierarchical Temporal Memory (HTM)," Numenta, Inc., Mar. 8, 2017, retrieved on Mar. 28, 2018 from https://numenta.com/assets/pdf/biological-and-machine-intelligence/BAMIComplete.pdf, 69 pages.
Numenta, "Hierarchical Temporal Memory including HTM Cortical Learning Algorithms," Version 0.2.1, Numenta, Sep. 12, 2011, 68 pages.
Numenta, "Sparse Distributed Representations," Numenta, available from https://numenta.com/assets/pdf/biological-and-machine-intelligence/BaMISDR.pdf and accessed on Mar. 29, 2017, retrieved on Mar. 28, 2018, 15 pages.
Olshausen, et al., "Sparse Coding with an Overcomplete Basis Set, A Strategy Employed by VI?," Olshausen, B.A., Field, D.J., 1997, Vision Research, 37:3311-3325) retrieved on Mar. 28, 2018 from http://www.chaos.gwdg.de/michael/CNScourse_2004/papersmax/OlshausenField1997.pdf, Dec. 24, 1996, 15 pages.
Plohmann D., et al., "Case study of the Miner Botnet", Cyber Conflict (CYCON), 2012 4th International Conference on Jun. 5, 2012, pp. 1-16.
International Search Report and Written Opinion for PCT Application No. PCT/EP2016/067308, dated Sep. 21, 2016, 8 pages.
Shah S.Y., et al., "Price Based Routing for Event Driven Prioritized Traffic in Wireless Sensor Networks," Apr. 29-May 1, 2013, IEEE 2nd Network Science Workshop, XP032487185, 8 pages.
Purdy S., "Encoding Data for HTM Systems," Available from Cornell University Library (citation arXiv: 1602.05925), retrieved on Mar. 28, 2018 from https://arx.iv.org/ftp/arx.iv/papers/1602/1602.05925.pdf, Numenta, Inc., Redwood City, California, USA, Feb. 2016, 11 pages.
Rosenfeld M., "Overview of Colored Coins," https:1/bravenewcoin.com/assets/Whitepapers/Overview-of-Colored-Coins.pdf, Dec. 4, 2012, 13 pages.
Skybox Security; Cybersecurity Management & Analytics retrieved from https://www.skyboxsecurity.com/ on Jul. 12, 2018, 7 pages.
Sood A.K., et al., "An Empirical Study of HTTP-based Financial Botnets," IEEE Transactions on Dependable and Secure Computing, IEEE Service Center, New York, NY, US, vol. 13 (2), Mar. 2016, pp. 236-251.
OPNET Technologies Network Simulator I Riverbed, retrieved from https://www.riverbed.com/products/ steel central/ opnet.html ?redirect=opnet on Jun. 28, 2018, 5 pages.
International Preliminary Report on Patentability for Application No. PCT/EP2015/080244, dated Jul. 13, 2017, 8 pages.
International Preliminary Report on Patentability for Application No. PCT/EP2015/080246, dated Jul. 13, 2017, 8 pages.
International Preliminary Report on Patentability for Application No. PCT/EP2016/067308, dated Feb. 15, 2018, 7 pages.
International Preliminary Report on Patentability for Application No. PCT/EP2016/067309, dated Feb. 15, 2018, 7 pages.
International Preliminary Report on Patentability for Application No. PCT/EP2016/067310, dated Feb. 15, 2018, 8 pages.
Asmi E.A.K., et al., "Bitcoin-Based Decentralized Carbon Emissions Trading Infrastructure Model," Systems Engineering, Mar. 2015, vol. 18 (2), Retrieved from the Internet: URL: https://www.researchgate.net/publication/268686553, 15 pages.
International Preliminary Report on Patentability for Application No. PCT/EP2017/055094, dated Oct. 11, 2018, 8 pages.
International Search Report and Written Opinion for Application No. PCT/EP2017/055094, dated May 15, 2017, 10 pages.
Tschorsch F., et al., "Bitcoin and Beyond: A Technical Survey on Decentralized Digital Currencies," International Association for Cryptologic Research, May 15, 2015, pp. 1-37.
Wang Z., "The Applications of Deep Learning on Traffic Identification," 2015.
Wikipedia, "Block chain (database)—Wikipedia, the free encyclopedia", Nov. 29, 2015, retrieved from the Internet: URL: https://en.wikipedia.org/w/index.php?title=Block_chain_(database)&oldid=692921608.
U.S. Appl. No. 16/065,637, filed Jun. 22, 2018, Inventor(s): El-Moussa et al.
International Search Report for corresponding International Application No. PCT/EP2016/082477 dated Feb. 22, 2017; 3 pages.
Written Opinion for corresponding International Application No. PCT/EP2016/082477 dated Feb. 22, 2017; 5 pages.
Fischer, et al; "Training Restricted Boltzmann Machines: An Introduction," vol. 47, No. 1, Jun. 7, 2013, 27 pgs.
International Search Report and Written Opinion for corresponding PCT Application No. PCT/EP2017/068738 dated Oct. 9, 2017; 13 pgs.
International Search Report and Written Opinion for corresponding PCT Application No. PCT/EP2017/069272 dated Feb. 20, 2018; 13 pgs.

\* cited by examiner

SOFTWARE SECURITY

CROSS-REFERENCE TO RELATED APPLICATION

The present application is a National Phase entry of PCT Application No. PCT/EP2016/082477, filed Dec. 22, 2016, which claims priority from EP Patent Application No. 15202731.4, filed Dec. 24, 2015, each of which is hereby fully incorporated herein by reference.

TECHNICAL FIELD

The present disclosure relates to software security. In particular it relates to identifying malicious code executing in a runtime software environment.

BACKGROUND

Software for execution in a computer system is increasingly deployed to runtime environments such as runtime engines or system software environments for the execution of program code. Runtime environments can be employed to provide a hardware abstraction, application portability, to offer common and/or centralized services such as operating system and service interfaces, resource management, application programming interfaces, security and the like. An example of a popular runtime environment is the Java runtime environment provided by Oracle Corp.

Software for execution in a runtime environment can come from an unknown and/or untrusted source, such as Java applets accessed via web pages. To preserve the security of a runtime environment and the computer system on which the runtime environment executes, such software can be executed in a mode of the runtime environment in which security restrictions and/or controls are in place. For example, in the Java runtime environment a Java applet originating outside a computer system will execute in a restricted operating mode of a Java runtime environment known as a "sandbox". A strict security policy applies to software executing within the sandbox an enforced by security services of the runtime environment. Where an application is able to escape the confines of the sandbox then a computer system's resources and data are at risk of misappropriation or misuse. This challenge is particularly acute for software originating from an unknown and/or untrusted source.

SUMMARY

Accordingly it would be beneficial to address the aforementioned security challenges in software runtime environments.

The present disclosure accordingly provides, in a first aspect, a computer implemented method of detecting malicious code in a software application executing with a runtime environment in a computer system, the method comprising: receiving a definition of one or more runtime exception trigger conditions, each trigger condition defining criteria for the runtime environment to enter a software exception state and having associated a definition of a resulting state of the runtime environment having entered the exception state; monitoring the runtime environment to detect the satisfaction of a detected trigger condition by the runtime environment and, in response to a determination that the runtime environment fails to enter a resulting state associated with the detected trigger condition, identifying the software application as including malicious code.

Thus, in use at a runtime of the software application the runtime environment is monitored for the identification of a state of operation of the runtime environment in which an exception is triggered as determined with reference to the exception trigger conditions. Where an exception trigger condition indicates such a state of operation the environment is monitored to determine whether a resulting state of operation is entered. Where the method determines that the runtime environment fails to enter the resulting state then malicious code is detected since this failure indicates that the operation of an exception triggering and handling process has been modified to exploit the runtime environment Accordingly embodiments of the invention are suitable for identifying malicious code in a software application and upon such identification protective and/or remedial measures can be adopted and/or the identification, nature, structure and/or content of the application can be recorded, flagged and shared within and outside the computer system to aid detection and intervention for the malicious code in future. A benefit of embodiments of the present invention is that both the identification of triggering conditions/resulting states and monitoring of the runtime environment in execution are extrinsic to the runtime environment and are therefore relatively protected from exploitation by malicious code itself. The parsing and recording steps could be achieved outside the reach of an application executing in the runtime environment. The approach is also particularly suited to identifying day zero attacks based on a frequently exploited category of code relating to exception dispatch and handling.

In some embodiments, one or more exception trigger conditions include a Boolean condition.

In some embodiments, one or more definitions of a resulting state include an identification of an exception dispatched by the runtime environment.

In some embodiments, one or more definitions of a resulting state include an identification of a function executed by the runtime environment.

In some embodiments, the application is received via a computer network.

In some embodiments, the method further comprises, in response to the identification that the software application includes malicious code, terminating execution of the software application.

In some embodiments, the method further comprises, in response to the identification that the software application includes malicious code, generating an indication of the malicious code.

The present disclosure accordingly provides, in a second aspect, a computer system to detect malicious code in a software application executing with a runtime environment comprising a processor and a data store, wherein the processor is adapted to: receive a definition of one or more runtime exception trigger conditions, each trigger condition defining criteria for the runtime environment to enter a software exception state and having associated a definition of a resulting state of the runtime environment having entered the exception state; and monitor the runtime environment to detect the satisfaction of a detected trigger condition by the runtime environment and, in response to a determination that the runtime environment fails to enter a resulting state associated with the detected trigger condition, identifying the software application as including malicious code.

The present disclosure accordingly provides, in a third aspect, a computer system including a software runtime environment for executing a software application, the computer system comprising: a data store storing a definition of one or more runtime exception trigger conditions, each trigger condition defining criteria for the runtime environment to enter a software exception state and having associated a definition of a resulting state of the runtime environment having entered the exception state, and a processor executing computer program code to monitor the runtime environment in execution to detect the satisfaction of a detected trigger condition by the runtime environment and, in response to a determination that the runtime environment fails to enter a resulting state associated with the detected trigger condition, identifying the software application as including malicious code.

The present disclosure accordingly provides, in a fourth aspect, a computer program element comprising computer program code to, when loaded into a computer system and executed thereon, cause the computer to perform the method as described above.

BRIEF DESCRIPTION OF THE DRAWINGS

Embodiments of the present disclosure will now be described, by way of example only, with reference to the accompanying drawings, in which.

DETAILED DESCRIPTION OF THE DRAWINGS

Embodiments of the present disclosure address challenges identifying malicious code in a software application executing within a runtime environment of a computer system. A sandbox is a controlled portion of a runtime environment for permitting the execution of software applications while restricting one or more of resource, data, service, facility, interface and/or other features of a computer system and/or runtime environment in order to protect the computing system. Thus a sandbox is intended to protect resources and data of a computer system executing a runtime environment. Protection is required against, for example, software applications from untrusted or unknown sources that may seek to attack or exploit the computer system. While a sandbox is intended to restrict the privileges of an executing application, an ability to elevate or change security privileges based on defined security policies is available within a sandbox. For example, a runtime environment can provide an escalated privilege level for authorized applications executing within a sandbox such that otherwise protected resources are accessible to such authorized software. In some environments it is possible to remove the constraints of a sandbox altogether for authorized software applications. Mechanisms therefore exist for privilege escalation of authorized software which introduces an inherent weakness in the sandbox model if malicious software could enjoy such escalated privilege.

Malicious software may seek to compromise the effectiveness of the sandbox by exploiting weaknesses in the sandbox implementation. In particular, forcing a sandbox implementation to enter an exception or error state can present many vulnerabilities. Error or exception states in software are difficult to test exhaustively during development and the numerous logic-routes to, and consequences of, an error or exception state can be difficult to predict. Error or exception states usually invoke exception handling logic involving the execution of code paths rarely traversed during normal operation. This is especially true where such error or exception states arise due to a contrived unusual and/or unforeseen state of operation of the sandbox. A simple example is the omission of arguments for API calls causing null-pointer exceptions handled by exception handlers. The security of such exception handlers may be sub-standard or not exhaustively considered/tested and therefore presents potentially numerous new vulnerabilities for malicious software to exploit.

As remedial and protective measures may be implemented in exception handling routines, malicious software can go further to attempt to exploiting vulnerabilities to prevent or preclude error or exception detection and handling. For example, internal method calls to verification and validation methods may be coded-out of inline execution so bypassing error handling logic. Alternatively, arguments for such methods may be modified or removed to prevent error or exception handling and potentially permit access by malicious code to protected resources.

Figure 1:
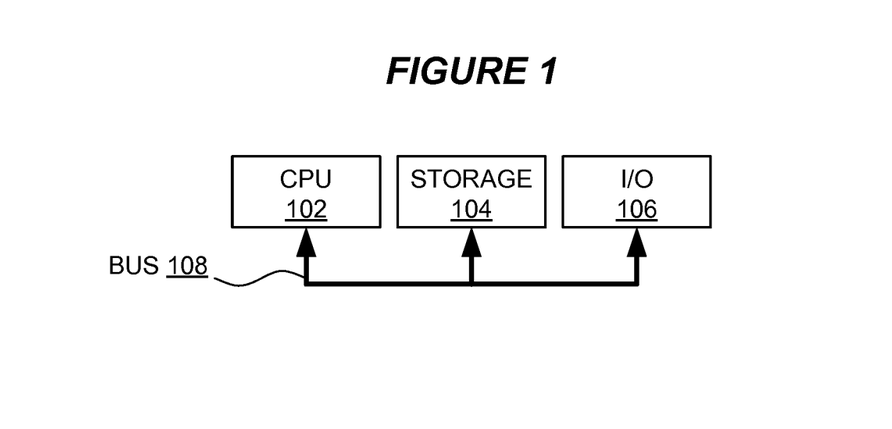
FIG. 1 is a block diagram of a computer system suitable for the operation of embodiments of the present disclosure.

FIG. 1 is a block diagram of a computer system suitable for the operation of components in embodiments of the present disclosure. A computer system such as is illustrated in FIG. 1 can be a physical or virtualized computing environment comprising one or more of hardware, software and/or firmware such as a physical personal, micro, mini or mainframe computer system, a network of connected computer systems, a virtualized computer system and the like. Notably, mobile and pervasive devices such as smartphones, tablet computers, navigation aids, mobile terminals, sensors and the like also constitute computer systems. A central processor unit (CPU) 102 is communicatively connected to storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
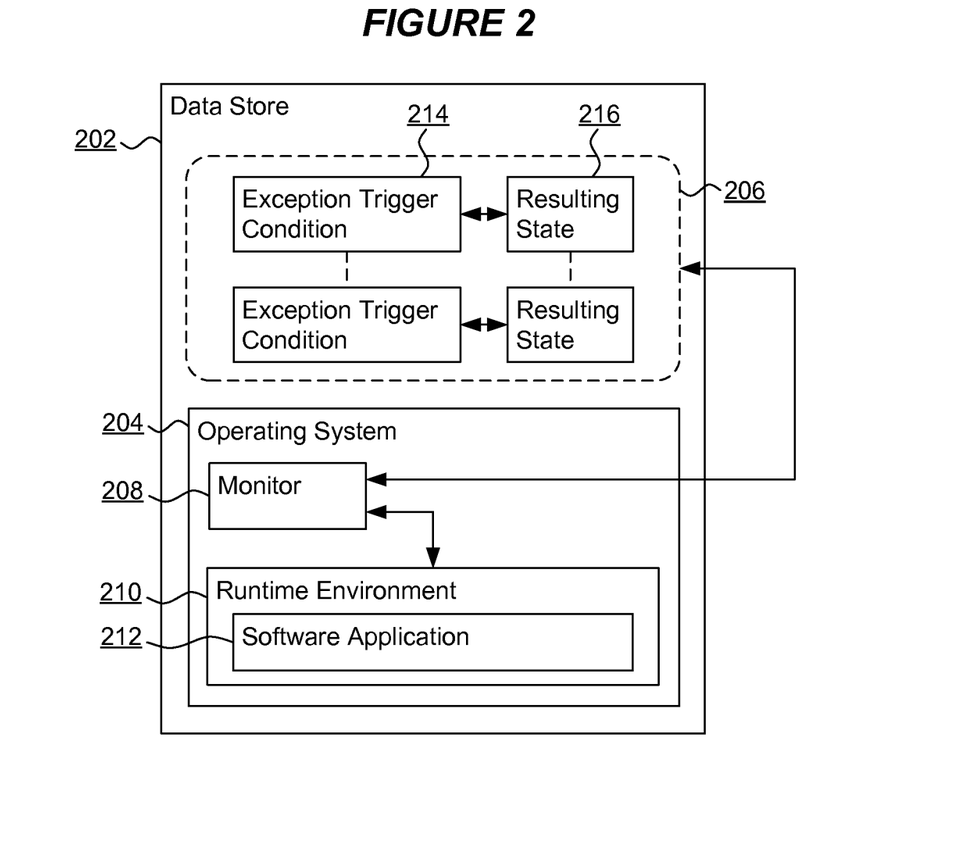
FIG. 2 is a component diagram of a data store of a computer system configured to detect malicious code in a software application in accordance with embodiments of the present disclosure.

FIG. 2 is a component diagram of a data store 202 of a computer system configured to detect malicious code in a software application 212 in accordance with embodiments of the present invention. The data store 202 is a storage 104 of a computer system and stores data and instructions for execution by one or more physical or virtual CPUs 102. Notably, the data store 202 may be an aggregate, distributed or consolidated storage mechanism or otherwise arranged or configured from multiple physical or virtual data storage devices. The data store 202 stores an operating system 204 of the computer system providing operating system services, facilities and functions including, for example, file handling, directory services, user services, authentication services, security policies, user interfaces, network services, application programming interfaces, memory management and the like as will be apparent to those skilled in the relevant art.

Executing with the operating system 204 is a runtime environment 210 as a software environment for the execution of software applications such as application 212. In one example the runtime environment 210 is an application container environment for the execution of software applications. In an alternative example the runtime environment 210 is a virtual machine execution environment providing virtual storage resources and one or more virtual processors for the execution of application code. In some embodiments the runtime environment 210 includes libraries, classes, functions or services supporting the execution of software applications and providing facilities to applications for their execution. Thus the runtime environment 210 may provide application programming interfaces (APIs) for file handling, inter alia: network communication; memory management; data structure instantiation and handling; standard functions such as mathematical functions, string handling, data type handling, data conversion, frequently used routines and the like; error handling; garbage collection; compilation and/or interpretation; just-in-time compilation; synchronization; native interfaces; and the like. In such embodiments the runtime environment 210 can constitute all or part of an intermediate code representation.

The runtime environment 210 receives and executes software code for an application 212. The application 212 is provided in a form that can be executed by the runtime environment 210 such as a binary or object code representation. In some embodiments the application 212 is provided as an intermediate code representation for interpretation or subsequent compilation, such intermediate representation corresponding to a conversion or compilation of source code to a portable, platform neutral or common intermediate format for subsequent interpretation or compilation for a native hardware or software environment. For example, such an intermediate representation can be a bytecode representation. The application 212 could conceivably be provided in a source code or pre-processed source code form that requires processing such as interpretation, conversion or translation prior to execution by the runtime environment 210 and the runtime environment 210 may include or have associated a relevant processing mechanism for effecting such processing.

In some embodiments the application 212 originates from an unknown or untrusted source such as a website or internet server. Accordingly, in some embodiments of the present disclosure the runtime environment 210 operates a mode of execution for the application 212 that restricts the application 212 from access to one or more resources, services, interfaces, facilities, subroutines, functions, classes, methods and/or the like in accordance with, for example, a security policy such as by executing the application 212 in a sandbox environment.

In one embodiment the runtime environment 210 is the Java Runtime Environment (JRE) provided by Oracle Corp and the software application 212 is a Java applet such as may be referenced and/or provided via a web-page over a network such as the internet.

A monitor 208 software component also operates with the operating system 204. The monitor 208 is a software component for monitoring one or more of the execution state and/or data state of the runtime environment 210 at a runtime of the software application 212. For example, the monitor 208 is configured to monitor which code such as functions, methods, subroutines and/or interfaces are called, executed or invoked in the runtime environment 210, such code being potentially code of the runtime environment 210 itself, libraries of the runtime environment 210 or code of the software application 212. Further, the monitor 208 can be configured to access data of the runtime environment 210 such as, inter alia: data structure arrangement and contents; variables; arguments; state information; the contents of data stores associated with the runtime environment 210; execution data structures such as stacks, heaps or the like; debugging information such; and the like. For example, in embodiments where the runtime environment 210 is a JRE, the monitor 208 can be a tool, function or suite employing or working with the Java Virtual Machine Tool Interface (JVM TI) as a native programming interface for inspecting and controlling the state of a JRE and application executing with the JRE. Notably the Monitor 208 is a trusted software component executing in a trusted mode of operation such that its access to the state information of the runtime environment 210 is permitted. Accordingly the monitor 208 is most preferably secured by a security means such as a firewall, operating system task or process separation or other suitable security means.

The data store 202 further includes a set of one or more data items 206 storing exception trigger conditions 214 and associated resulting states 216. An exception trigger condition 214 is a condition defining a state of execution of the runtime environment 210 that will cause the triggering of an exception. Hereinafter the term exception shall be used to refer to any exception, error, fault or abnormal state indication occurring within an executing software program. An exception is triggered if it is occasioned by a state of the runtime environment 210 satisfying an exception trigger condition 214. Once triggered, an exception will manifest in some way depending on the operation of the runtime environment 210. For example, in a JRE exceptions are managed using a "throw"/"catch" model of exception generation and handling whereby a software routine detecting an error state can "throw" a defined exception which may be "caught" by a defined "catch" block in a call stack. Thus error states can be communicated within an execution call stack by passing exception data structures using the "throw"/"catch" mechanism, with code in the call stack being able to catch exceptions for handling or propagation back through routines in a call stack. Java exceptions are all subclasses of the Java class "Throwable" that includes a stack trace. Thus, in a Java embodiment, the exceptions are first generated and then thrown, and the throwing of an exception can be said to be "dispatching" the exception. In other embodiments, the detection of an error state is a trigger of an exception, the creation of an indication, reference, message or other data item in respect of a triggered exception can be considered to be the generation of an exception, and the communication of the exception can be considered to be the dispatching of an exception.

Exceptions are generated in response to a detection of a trigger state of operation such as an error or fault state. Accordingly exceptions are associated with a state of operation that may relate to a particular function call, a particular data item, a particular argument or similar. Exceptions therefore have associated a condition such as a Boolean condition for determining the existence or otherwise of a trigger state for generating and dispatching an exception. At least a subset of these trigger conditions are stored in the data store 202 as exception trigger conditions 214.

Following the triggering of an exception the behavior, actions, processing or other response of the runtime environment 210 puts the runtime environment 210 into a new state resulting from the dispatch of the exception. This new state is herein referred to as a resulting state 216 that results from the dispatch of an exception. For example, a resulting state 216 can be, inter alia: the generation and dispatch of a further exception; the invocation and execution of a particular subroutine, function or method; the storage of a particular data item or value; the generation of a particular output, display or similar; and the like. A resulting state 216 is stored in the data store in association with an exception trigger condition 214 relating to an exception, the dispatch of which leads to the resulting state 216.

In use at a runtime of a software application 212 in the runtime environment 210 the monitor 208 monitors the runtime environment 210 for the identification of a state of operation of the runtime environment 210 in which an exception is triggered as determined with reference to the exception trigger conditions 214 of the data items 206. Where an exception trigger condition 214 indicates such a state of operation of the runtime environment 210 the monitor 208 further monitors the runtime environment 210 to determine if the environment 210 enters a new state of operation according to a resulting state 216 corresponding to the exception trigger condition 214. In normal operation, the runtime environment 210 in an exception state will transition to a corresponding resulting state 216 at some point in time following the exception state. Where the monitor 208 detects the resulting state 216 then the operation of the runtime environment 210 (and, accordingly, the application 212) is determined to be acceptable and execution continues. However, where the monitor 208 fails to detect the runtime environment 210 entering the corresponding resulting state 216 then the operation of the exception triggering, generation and dispatching process has been modified to exploit the runtime environment 210 and the software application 212 can be identified as including malicious code. Accordingly, a monitor 208 in accordance with embodiments of the present disclosure is suitable for identifying malicious code in a software application 212. Upon such identification of malicious code protective and/or remedial measures can be adopted and/or the identification, nature, structure and/or content of the application 212 can be recorded, flagged and shared within and outside the computer system to aid detection and intervention for the malicious code in future.

Figure 3:
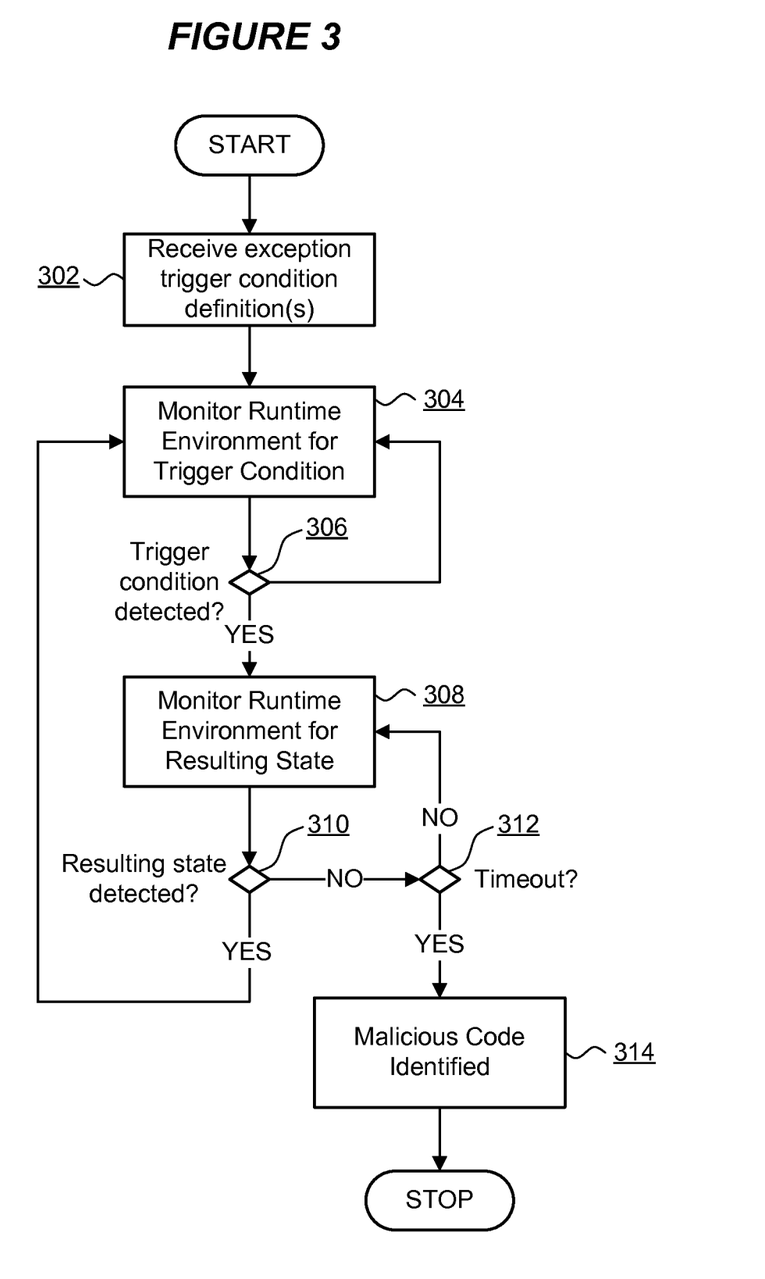
FIG. 3 is a flowchart of a method of detecting malicious code in a software application executing with a runtime environment in a computer system in accordance with embodiments of the present disclosure.

FIG. 3 is a flowchart of a method of detecting malicious code in a software application 212 executing with a runtime environment 210 in a computer system in accordance with embodiments of the present disclosure. Initially, at 302, the method receives a definition of one or more runtime exception trigger conditions 214 each defining criteria for the runtime environment 210 to enter a software exception state. Associated with each trigger condition 214 is a definition of a resulting state 216 of the runtime environment. Subsequently, at 304, the monitor 208 monitors to execution of the runtime environment 304 to identify satisfaction of an exception trigger condition 214 to indicate a state of operation of the runtime environment 210 that triggers an exception. Where an exception state is detected at 306 the method further monitors, at 308, the runtime environment 210 for a resulting state 216 corresponding to the exception trigger condition 214. If the resulting state 216 is detected at 310 the method returns to monitoring at 304. If the runtime environment 210 fails to enter a state corresponding to the resulting state 216 the method continues to monitor at 312 and 308 for a predetermined time period. Where the predetermined time period has passed ("timeout") then the method concludes the identification of malicious code in the application 212 at 314.

Figure 4:
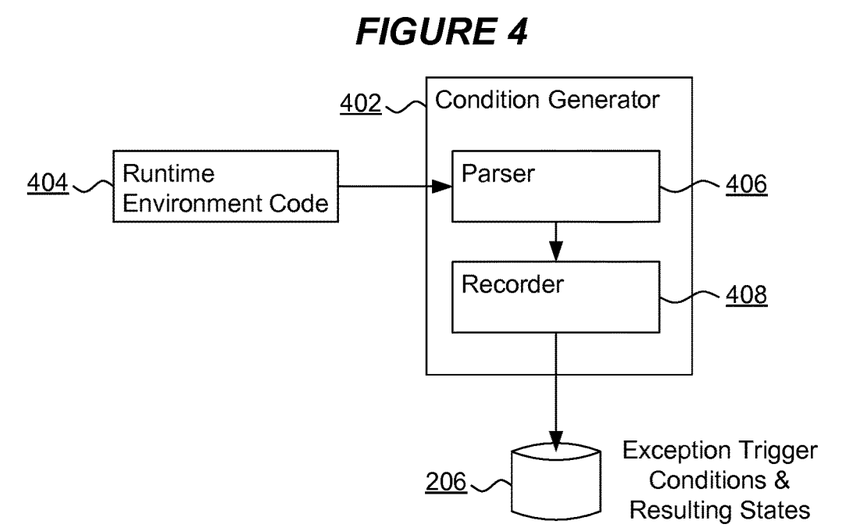
FIG. 4 is a component diagram of a condition generator for generating runtime exception trigger conditions in accordance with embodiments of the present disclosure.

FIG. 4 is a component diagram of a condition generator 402 for generating runtime exception trigger conditions 214 in accordance with embodiments of the present disclosure. The condition generator 402 is a hardware, software, firmware or combination component operating in association with, or contained within, the data store 202 of FIG. 2. The condition generator 402 is configured to parse, via a parser component 406, code 404 for the runtime environment 210 to identify one or more conditions, the satisfaction of which lead to the triggering of an exception in the runtime environment 210. The condition generator 402 further identifies resulting states 216 corresponding to each of the identified conditions 214. The condition generator 402 subsequently records, via the recorder component 408, exception trigger conditions 214 and corresponding resulting states 216 for subsequent use by the monitor 208 of FIG. 2.

Figure 5:
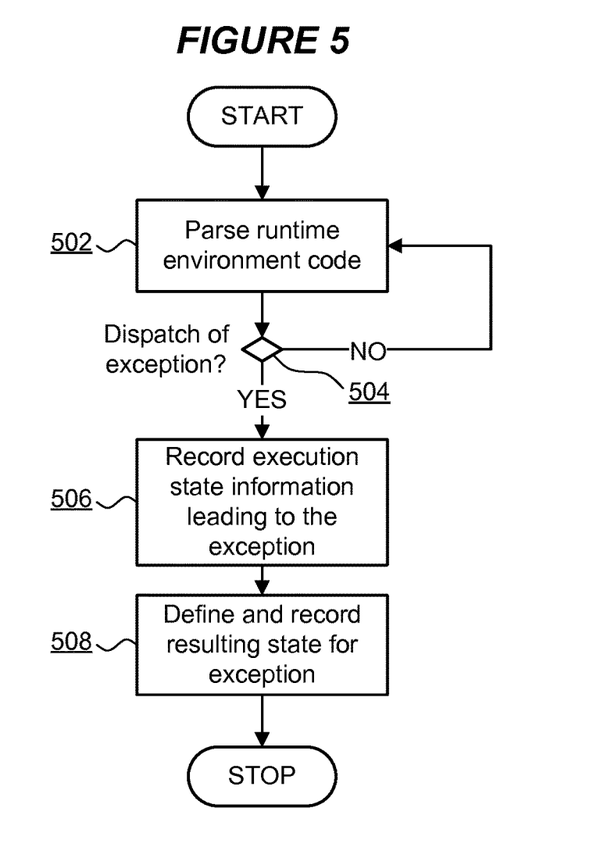
FIG. 5 is a flowchart of a method of the condition generator of FIG. 4 in accordance with embodiments of the present disclosure.

FIG. 5 is a flowchart of a method of the condition generator of FIG. 4 in accordance with embodiments of the present disclosure. Initially, at 502, the parser 406 parses runtime environment code 404. The runtime environment code 404 may be in a source code form, a debug-binary or debug-object code form (in which references to a source code form are provided), an intermediate code form (such as bytecode or the like), or an object code form. The parsing of the runtime environment code 404 identifies occurrences of exception dispatch such as the throwing of an exception in a Java runtime environment. Where an exception dispatch is detected at 504 the method identifies and records execution state information leading to the exception at state 506 as an exception trigger condition 214. The exception trigger condition 214 defines the conditions in which the exception is triggered and thus can be constituted as a Boolean condition based on features of the runtime environment 210 such as variable values, data item contents, function calls, method invocations and the like. Subsequently, at 508, the method identifies a resulting state 216 corresponding to the exception trigger condition 214 as a state of operation of the runtime environment 210 following the trigger of the exception. The identification of a resulting state 216 may involve waiting for a period to identify any new exceptions thrown, error indications or identifiers generated and/or communicated, the execution of particular functions, methods or subroutines and the like. The identified resulting state 216 is also recorded at 508.

Figure 6:
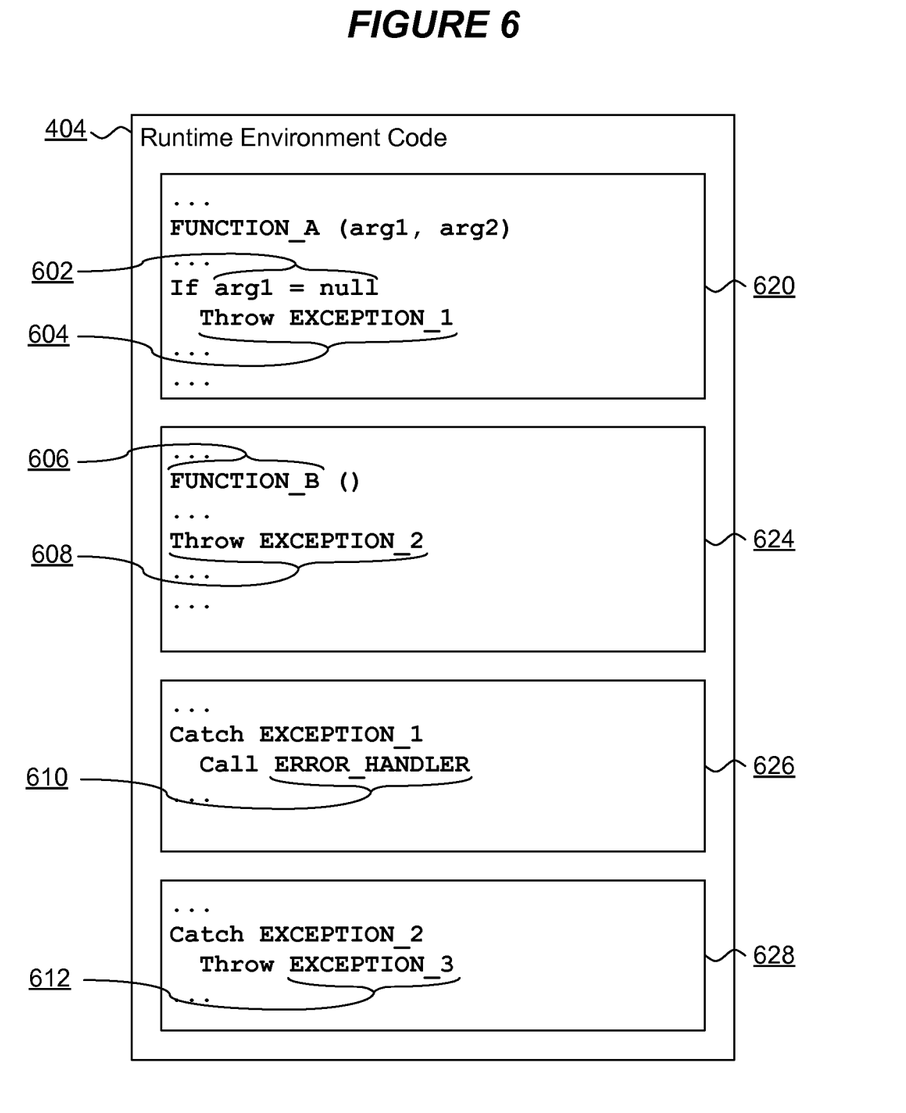
FIG. 6 is a depiction of a subset of exemplary runtime environment code in accordance with embodiments of the present disclosure.

The arrangement of FIG. 4 and the method of FIG. 5 will now be considered with reference to an exemplary subset of runtime environment code 404. FIG. 6 is a depiction of a subset of exemplary runtime environment code 404 in accordance with embodiments of the present disclosure. The runtime environment code 404 includes four separate code blocks 620, 624, 626 and 628 that may or may not be within the same module, class, function, procedure routine or library. A first code block 620 includes a function FUNCTION_A receiving two parameters arg1 and arg2. FUNCTION_A includes a test of a condition 602 based on arg1 the result of which can trigger the dispatch of a new exception EXCEPTION_1 at 604. Second code block 624 includes a function FUNCTION_B at 606 that triggers the dispatch of a new exception EXCEPTION_2 at 608. Code block 626 us configured to catch EXCEPTION_1 and in response to catching EXCEPTION_1 calls a function ERROR_HANDLER at 610. Code block 628 is configured to catch EXCEPTION_2 and in response to catching EXCEPTION_2 throws a further exception EXCEPTION_3 at 612.

Considering now the method of FIG. 5 for the exemplary runtime environment code 404 of FIG. 6. Initially at 502 the method parses the runtime environment code 404 identifies the dispatch of an exception EXCEPTION_1 at 604 in the function FUNCTION_A and a corresponding catch of EXCEPTION_1 in code block 626. At 506 the method identifies the condition "arg1=null" at 602 as an exception trigger condition 214 and records this to a data store. This condition is readily identified since it directly leads to the generation of the exception at 604. At 508 the method identifies the function call to function ERROR_HANDLER at 610 as a resulting state 216 corresponding to the exception trigger condition 214 for EXCEPTION_1 and records this to the data store.

The method of FIG. 5 further identifies, by parsing at 502, the dispatch of an exception EXCEPTION_2 at 608 in the function FUNCTION_B and a corresponding catch of EXCEPTION_2 in code block 628. At 506 the method identifies the execution of FUNCTION_B as directly leading to the trigger of EXCEPTION_2 and accordingly identifies a condition of the execution of FUNCTION_B as an exception trigger condition 214 and records this to the data store. At 508 the method identifies the dispatch of a further exception EXCEPTION_3 at 612 as a resulting state 216 corresponding to the exception trigger condition 214 for EXCEPTION_2 and records this to the data store.

Thus it can be seen that the exemplary method of the condition generator 402 is suitable for identifying exception trigger conditions 214 and corresponding resulting states 216 for defining the data items 206 of FIG. 2. In one embodiment the method of FIG. 5 of the condition generator 402 is used to parse substantially all code for a runtime environment 210 though a subset of the code may be sufficient. In this way the conditions for triggering and dispatching exceptions by the runtime environment 210 are defined extrinsic to the runtime environment 210 itself such that any modification of, misuse of, tampering with or manipulation of the runtime environment 210 can be detected extrinsic to the environment based on an analysis of the environment beforehand.

Figure 7:
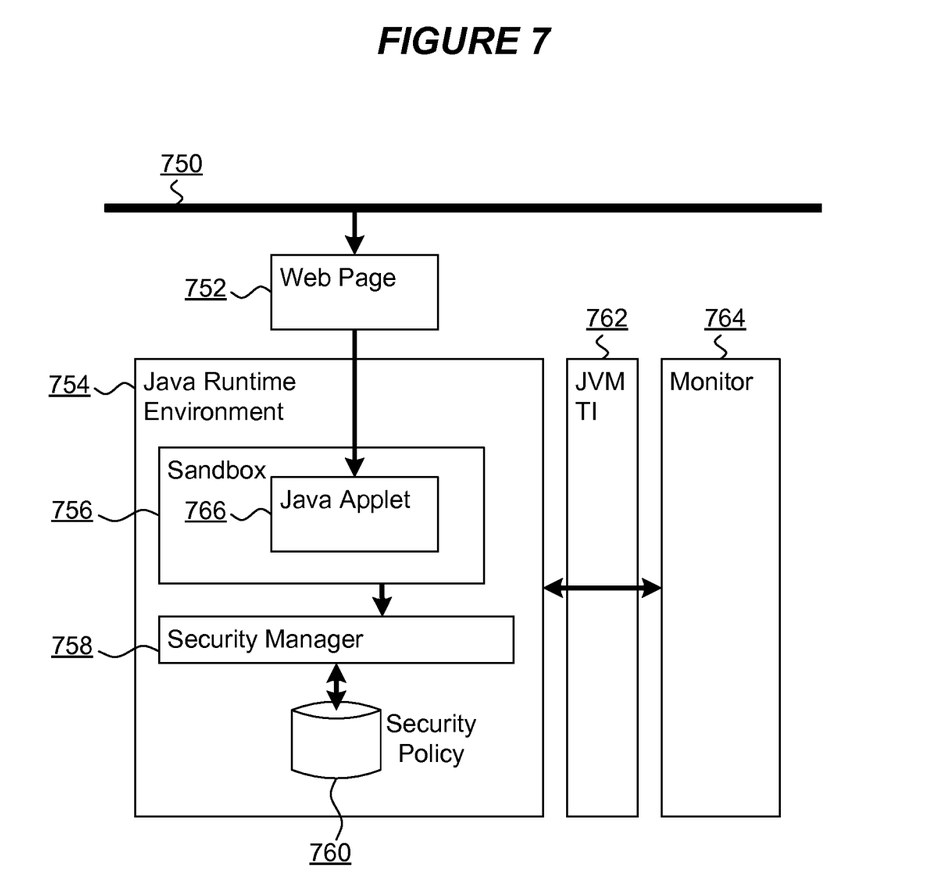
FIG. 7 is an illustrative component diagram of an arrangement in accordance with an exemplary embodiment of the present disclosure.

The operation of an exemplary embodiment of the disclosure will now be considered in detail. FIG. 7 is an illustrative component diagram of an arrangement in accordance with an exemplary embodiment of the present disclosure. A network 750 such as a wired, wireless communication means provides a web page 752 for receipt by a computer system executing a JRE 754. The JRE 754 includes a logical sandbox 756 for the execution of a java applet 766 received and/or referred to by the web page 752. The applet 766 is thus untrusted and/or from an unknown source and its operation is restricted to the functions, facilities and resources made available to it via the sandbox 756. Restrictions can include restrictions on access to a file system of the computer system, restrictions on access to network facilities, restrictions on access to libraries and the like.

The JRE 754 includes a security manager 758 for providing security facilities for the JRE 754. For example, the security manager 758 performs a permission check for actions requested by the applet 766 to determine if the actions are permitted by a security policy 760 applicable for the applet 766 in the sandbox 756. The arrangement further includes a monitor 764 substantially as hereinbefore described and implemented to access state information of the JRE 754 via a Java Virtual Machine Tools Interface 762.

In the exemplary arrangement of FIG. 7 the applet 766 includes malicious code for elevating the security privileges of the applet in the sandbox 766 by calling a setSecurityManager method of the JRE 754 with a null argument. Such a method call would result in the elevation of security privileges by replacing the security manager 758 with a new security manager implementing a more liberal security policy 760 except that such an outcome is prevented by the JRE due to the null argument. The null argument is detected by the JRE 754 resulting in an exception such as a NullPointerException which itself results in a Java.Security.AccessControlException. However, in the exemplary arrangement of FIG. 7 the applet 766 is further configured to exploit a weakness in the JRE 754, the security manager 758, an operating system of the computer system or any other aspect of the computer system to modify the operation of the JRE 754 to prevent the throwing of a NullPointerException. The exact nature of the exploit and weakness are not relevant here except that they may include a day-zero vulnerability being a vulnerability as yet unknown to the developers of the runtime environment and therefore representing a security exposure. In the arrangement of FIG. 7 the monitor 764 has access to a definition of an exception trigger condition 214 identifying that a call to the setSecurityManager method with a null argument is a condition for triggering an exception. Further, the exception trigger condition 214 has associated a resulting state 216 identifying the dispatch of a Java.Security.AccessControlException as a result of the triggered exception. The operation of the monitor 764 in accordance with an embodiment of the present invention to detect the exploitation of the JRE 754 will now be described with reference to FIG. 8.

Figure 8:
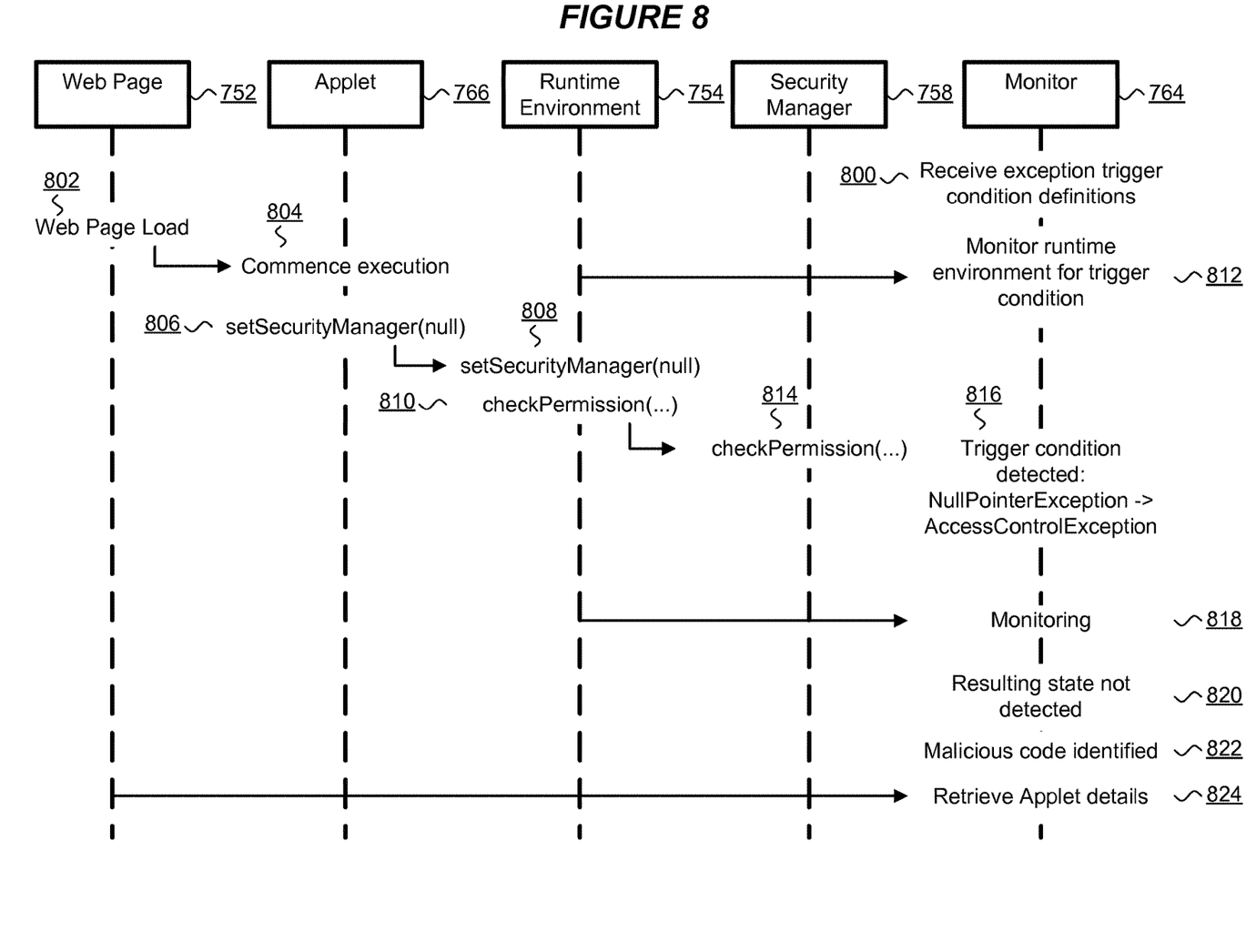
FIG. 8 is an illustrative flow diagram of the exemplary arrangement of FIG. 7 in use.

FIG. 8 is an illustrative flow diagram of the exemplary arrangement of FIG. 7 in use. Initially, at 800, the monitor 764 receives exception trigger condition 214 definitions including corresponding resulting states 216 as defined above. At 812 the monitor 764 commences monitoring of the JRE 754 via the JVM TI for the identification of an exception trigger condition.

At 802, the web page 752 is loaded and applet 766 is instantiated in the JRE 754 for commencement of execution at 804 in the sandbox 756. At 806 the applet 766 calls setSecurityManager with a NULL argument. At 808 the JRE 754 invokes the setSecurityManager method with a NULL argument which results in a checkPermission method call. The checkPermission method call includes arguments for checking if the applet 766 has the required privileges to change the security manager to a new security manager identified by a NULL argument. At 814 the security manager 758 executes the checkPermission method which, due to the NULL argument, would normally result in a NullPointerException. In the exemplary embodiment of FIG. 8 no such NullPointerException is generated because the JRE 754 has been exploited by the applet previously and the NullPointerException has been prevented by the exploit.

However, at 816 the monitor 756, monitoring the JRE 754 via the JVM TI, identifies that an exception trigger condition 214 has been satisfied: the setSecurityManager call with a NULL argument is expected to trigger a NullPointerException with the resulting state of the dispatching of a Java.Security.AccessControlException. Accordingly, the monitor 764 continues to monitor the JRE 754 at 818 for a predetermined time period to detect the resulting state 216 (i.e. the throwing of a Java.Security.AccessControlException). At 820 the monitor 764 concludes its monitoring with a determination that the resulting state 216 was not detected (no Java.Security.AccessControlException was thrown) and accordingly at 822 the monitor 764 identifies that the applet 766 includes malicious code. Optionally, at 824, the monitor 764 retrieves details of the applet 766 with reference to the originating web page 752. In other embodiments the applet 766 can be isolated, terminated, further monitored or otherwise processed for the purpose of intrusion detection, prevention and/or remediation.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present disclosure has been described in relation to the above described example embodiments, the invention is not limited thereto and that there are many possible variations and modifications which fall within the scope of the claims.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method of detecting malicious code in a software application executing with a runtime environment in a computer system, the method comprising:
receiving a definition of one or more runtime exception trigger conditions, each runtime exception trigger condition defining criteria for the runtime environment to enter a software exception state and having associated a definition of a resulting state of the runtime environment having entered the exception state; and
monitoring the runtime environment to detect satisfaction of a detected runtime exception trigger condition by the runtime environment and, in response to a determination that the runtime environment fails to enter a resulting state associated with the detected runtime exception trigger condition, identifying the software application as including malicious code.

2. The method of claim 1, wherein the one or more runtime exception trigger conditions include a Boolean condition.

3. The method of claim 1, wherein one or more of the definitions of a resulting state include an identification of an exception dispatched by the runtime environment.

4. The method of claim 1, wherein one or more of the definitions of a resulting state include an identification of a function executed by the runtime environment.

5. The method of claim 1, wherein the software application is received via a computer network.

6. The method of claim 1, further comprising, in response to the identification that the software application includes malicious code, terminating execution of the software application.

7. The method of claim 1, further comprising, in response to the identification that the software application includes malicious code, generating an indication of the malicious code.

8. A computer system to detect malicious code in a software application executing with a runtime environment comprising:
a processor and a data store, wherein the processor is adapted to:
receive a definition of one or more runtime exception trigger conditions, each runtime exception trigger condition defining criteria for the runtime environment to enter a software exception state and having associated a definition of a resulting state of the runtime environment having entered the exception state; and
monitor the runtime environment to detect satisfaction of a detected runtime exception trigger condition by the runtime environment and, in response to a determination that the runtime environment fails to enter a resulting state associated with the detected runtime exception trigger condition, identifying the software application as including malicious code.

9. A computer system including a software runtime environment for executing a software application, the computer system comprising:
a data store storing a definition of one or more runtime exception trigger conditions, each runtime exception trigger condition defining criteria for the runtime environment to enter a software exception state and having associated a definition of a resulting state of the runtime environment having entered the exception state; and
a processor executing computer program code to monitor the runtime environment in execution to detect satisfaction of a detected runtime exception trigger condition by the runtime environment and, in response to a determination that the runtime environment fails to enter a resulting state associated with the detected runtime exception trigger condition, identifying the software application as including malicious code.

10. A non-transitory computer-readable storage medium comprising computer program code to, when loaded into a computer system and executed thereon, cause the computer system to perform a method comprising:
receiving a definition of one or more runtime exception trigger conditions, each runtime exception trigger condition defining criteria for the runtime environment to enter a software exception state and having associated a definition of a resulting state of the runtime environment having entered the exception state; and monitoring the runtime environment to detect satisfaction of a detected runtime exception trigger condition by the runtime environment and, in response to a determination that the runtime environment fails to enter a resulting state associated with the detected runtime exception trigger condition, identifying the software application as including malicious code.

* * * * *